United States Patent

Van Ryper et al.

[11] Patent Number: 5,988,649
[45] Date of Patent: Nov. 23, 1999

[54] FRACTURED SEAL RING

[75] Inventors: Richard Gerard Van Ryper, Wilmington, Del.; James Ronald Mott, Landenberg, Pa.; Arnold Wayne Raymond, Newark, Del.; Christopher Scott Stenta, North East, Md.

[73] Assignee: E. I. du Pont de Nemours and Company, Wilmington, Del.

[21] Appl. No.: 08/848,072

[22] Filed: May 1, 1997

[51] Int. Cl.⁶ ................................ F16J 9/14; F16J 9/28
[52] U.S. Cl. ................ 277/435; 277/448; 277/498; 277/582; 277/944
[58] Field of Search .................... 277/496, 498, 277/448, 435, 582, 944

[56] References Cited

U.S. PATENT DOCUMENTS

| | | | |
|---|---|---|---|
| 1,397,334 | 11/1921 | Schmolinski | 277/496 X |
| 2,448,147 | 8/1948 | Jacobsen | 29/148 |
| 2,717,023 | 9/1955 | Hetherington | 277/944 X |
| 3,420,536 | 1/1969 | Grover | 277/165 |
| 3,720,418 | 3/1973 | Berg | 277/9 |
| 4,189,161 | 2/1980 | Grimm | 277/496 |
| 5,192,085 | 3/1993 | McOnie | 277/81 S |
| 5,403,020 | 4/1995 | McOnie | 277/81 S |
| 5,695,197 | 12/1997 | Farley et al. | 277/1 |

FOREIGN PATENT DOCUMENTS 2393210  12/1978  France.

*Primary Examiner*—Lynne H. Browne
*Assistant Examiner*—David E. Bochna
*Attorney, Agent, or Firm*—Inna Y. Belopolsky

[57] ABSTRACT

A seal ring for placement in the space between a radial groove of a cylindrical member and a housing forming a bore in which the cylindrical member is movably positioned, which is free of scoring and has a fracture line through its thickness to form opposing faces. The faces are rough and mesh together such that when the faces are forced into contact, the faces are then interlocked. Furthermore, the seal ring has true roundness to enable the seal ring to seal the space despite presence of the fracture line. The seal ring is made up of a rigid polymer such as a polyimide, polyamide, polyester, polyetheretherketone, polyamideimide, polyetherimide, polyphenylene sulfide, and polybenzimidazole. The seal ring of the present invention is capable of single ring sealing of the space between the bore and the radial groove. The present invention also provides a device for fracturing the seal ring.

2 Claims, 2 Drawing Sheets

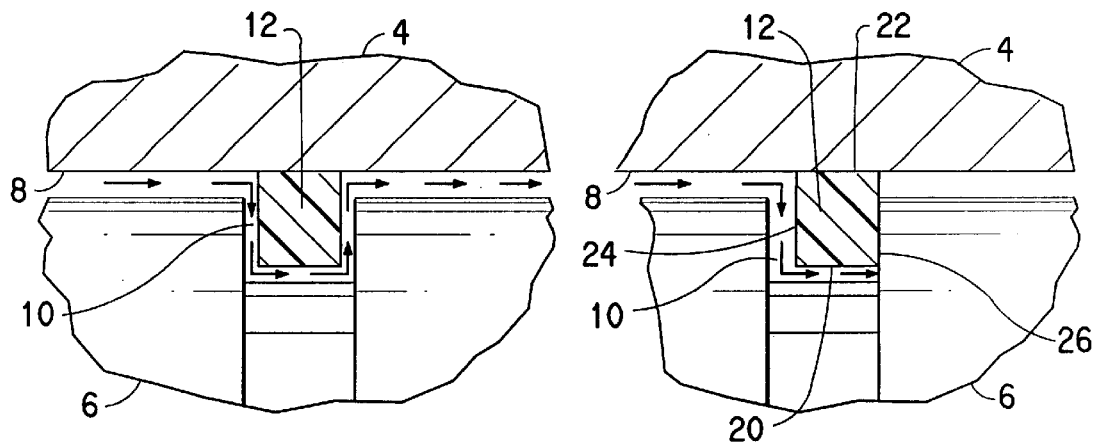
FIG. 5A    FIG. 5B
FIG. 6A
(PRIOR ART)
FIG. 6B
(PRIOR ART)
FIG. 6C
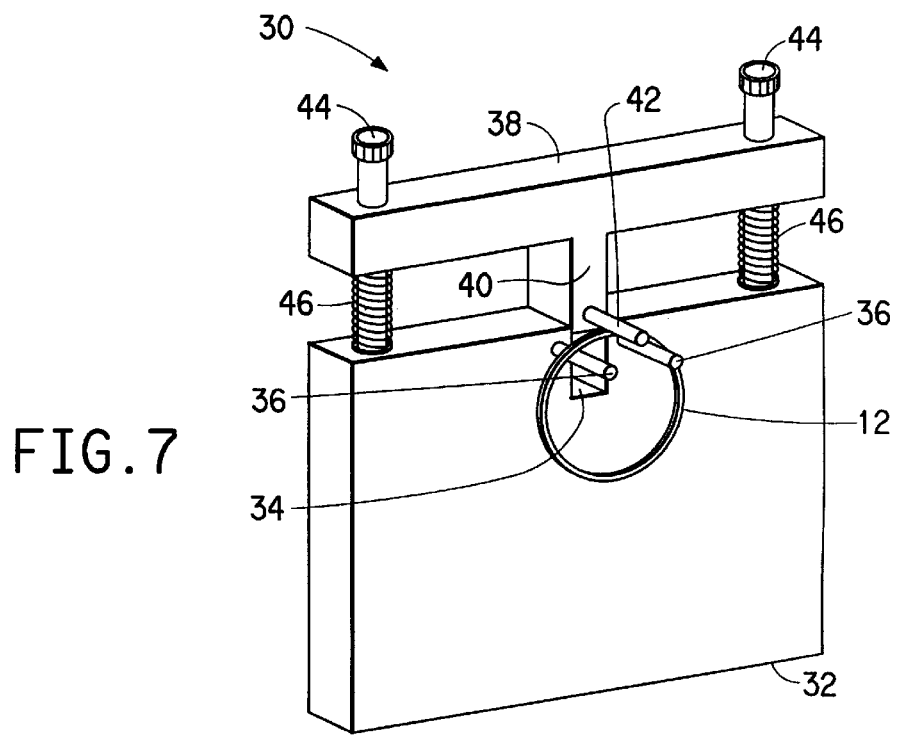
FIG. 7

FRACTURED SEAL RING

BACKGROUND OF THE INVENTION

1. Field of the Invention

This invention relates to sealing rings made from rigid polymers. More specifically, the present invention relates to seal rings which can be used in static, reciprocating and rotating applications to perform a sealing function. Such rings are used in applications where fluids in the form of liquid or gas are isolated, such that the fluid exerts pressure against the seal ring thereby creating a sealed surface.

2. Background of the Invention

As is generally known, such rings have been made out of various materials, most commonly made from metals such as cast iron, flexible elastomers, and various polymers. Since the ring is placed in a groove of a piston or shaft, a gap must be placed in the ring so as to facilitate application of and removal from the piston or shaft. The known methods for preparing gaps in these rings have been to machine in the case of metals and polymers and to cut in the case of flexible polymers. Both machining and cutting of such rings has been both tedious and labor intensive, resulting in higher part costs. Likewise, when a ring has been machined, material is actually removed from the ring such that when the machined edges are brought back into contact with each other, the ring is then "out of round."

In U.S. Pat. No. 3,720,418 to Berg, a method for fracturing a ring is described wherein a "notch" is first etched or scored into the outer surface of a ring, and then the notched area is struck with a heavy object to create the fracture. Notching of the ring surface before fracturing usually results in a groove being permanently left in the outer surface of the fractured edge. A groove in the outer surface from etching or scoring, as well as deformation of the ring from machining, results in an escape route for the pressurized fluid.

The need exists for a sealing ring of a rigid polymer which is inexpensive to manufacture and is easily installable without sacrificing sealing quality.

SUMMARY OF THE INVENTION

The present invention satisfies this need by providing a seal ring for placement in the space between a radial groove of a cylindrical member and a housing forming a bore in which the cylindrical member is movably positioned. The seal ring is made up of a rigid polymer such as a polyimide, polyamide, polyester, polyetheretherketone, polyamideimide, polyetherimide, polyphenylene sulfide, and polybenzimidazole. The surface of the seal ring is free of scoring, and has a fracture line through the seal ring's thickness to form opposing faces. These faces are rough and mesh together such that when the faces are forced into contact, the faces are then interlocked. Furthermore, the seal ring has true roundness to enable the seal ring to seal the space despite presence of the fracture line. The seal ring of the present invention is capable of single ring sealing of the space between the bore and the radial groove. The present invention also provides a device for fracturing the seal ring.

BRIEF DESCRIPTION OF THE DRAWINGS

FIG. 5A is an enlarged view of the seal ring positioned in the radial groove of the cylindrical member of FIG. 4 which shows the direction of flow of fluid prior to sealing.

FIG. 5B is an enlarged view of the seal ring positioned in the radial groove of the cylindrical member of FIG. 4, which shows the seal in its sealing relationship.

FIG. 6A is a fragmentary view of the prior art's removal of material from the seal ring during scoring, wherein the scoring aided in initiating the fracture.

FIG. 6B is a fragmentary view of the prior art's removal of material from the seal ring during machining to create the gap in the seal ring.

FIG. 6C is a two-dimensional fragmentary view of the fracture line of the seal ring of the present invention showing the opposing faces in meshed and interlocked relationship.

FIG. 7 is an isometric view of one embodiment of a device for creating a fracture line in a seal ring of the present invention.

DETAILED DESCRIPTION

Figure 4:
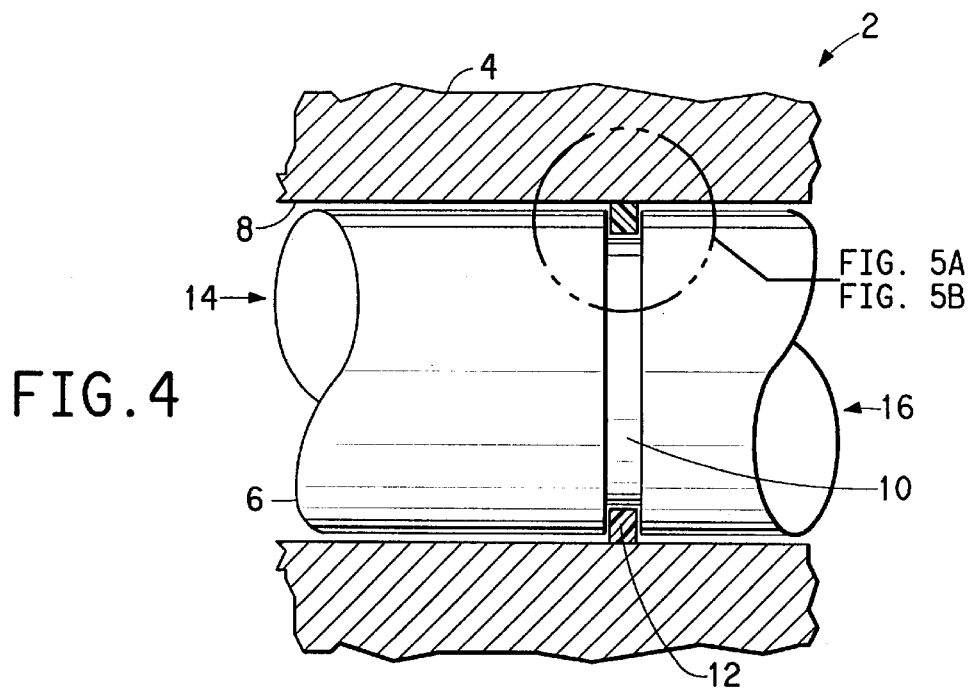
FIG. 4 is a cross-sectional view of the seal ring positioned within a radial groove of a cylindrical member to perform a sealing function when the cylindrical member is positioned within a bore of a housing.

A seal assembly shown generally at 2, in FIG. 4, is made up of a housing 4 and a cylindrical member 6 movably positioned within a bore 8 of the housing 4. The cylindrical member 6 moves within the bore 8, in either a reciprocating or rotating mode. The cylindrical member 6 has a radial groove 10 for seating a seal ring 12, such that when the cylindrical member is positioned within the housing, the seal ring performs a sealing function.

As may be expected, leakage of fluids across the seal ring 12 is evidence that the seal assembly 2 is not functioning properly. When the seal ring is positioned within the seal assembly and upon pressurization of the seal assembly, a properly functioning seal ring will prevent, or at least minimize, leakage of fluids. The cylindrical member 6 has a pressurized side upstream of the seal ring indicated generally at 14 and a non-pressurized side downstream of the seal ring indicated generally at 16. The seal ring 12 functions by isolating the pressurized side 14 from the non-pressurized side 16.

The seal ring 12 is made up of several surfaces including an inner surface 20 and an outer surface 22, as well as an upstream surface 24 and downstream surface 26, as can be seen in FIG. 5B. Turning to FIG. 5A, prior to pressurization of the system, the seal ring would not prevent leakage of fluid because only one surface of the seal ring is in contact with the seal assembly. In fact, fluid would be free to flow through the radial groove 10 and around the seal ring 12. In operation and upon pressurization, as shown in FIG. 5B, the outer surface 22 and the downstream surface 26 of the seal ring 12 are forced simultaneously into sealing contact with the bore 8 and the radial groove 10, respectively, thereby forming a seal.

A bore, grooved shaft and seal ring create the seal assembly in a rotary-type seal application, whereas a cylinder, grooved piston and seal ring create the seal assembly in a reciprocating-type seal application.

Figure 3:
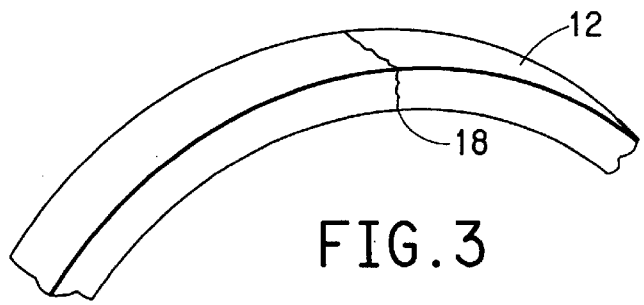
FIG. 3 is a three-dimensional fragmentary view of the seal ring which shows the fracture line of the seal ring.

The seal ring 12 of the present invention can be seen as a fragmentary view in FIGS. 3 and 6C. Since the inner diameter of the seal ring 12 is smaller than the outer diameter of the cylindrical member 6, and since the seal ring 12 is not elastic, the seal ring 12 must be temporarily expanded to create a gap such that the seal ring 12 may be placed into the radial groove 10 of the cylindrical member 6. In FIG. 6C, a fracture line 18 appears as a jagged line in the surface of the seal ring, extending through the thickness of the seal ring as can be seen in FIG. 3. According to the present invention, the fracture line 18 is created by the method described below, in order to facilitate placement of the seal ring into the radial groove 10.

The fracture line 18 consists of opposing faces which are perpendicular to the axis of the seal ring. In other words, the fracture line 18 essentially does not deviate at an angle to the radius. Additionally, the opposing faces are rough, as naturally occurs by the fracture method described below. When the seal ring is placed within the radial groove 10 of the cylindrical member 6, then placed within the bore 8 of the housing 4, the opposing faces are in or near contact with each other. As is generally known to those of ordinary skill in the art, the seal ring becomes heated during the rotational or reciprocating movement of the cylindrical member which causes the seal ring to thermally expand when the seal assembly is at operating conditions. For that reason, the opposing faces may not necessarily make contact until the operating conditions are reached. Along with temperature, fluid pressure is another operating condition which affects the seal rings ability to perform the sealing function. When operating pressure is achieved on the pressurized side 14 of the seal assembly 2, as described above, and operating temperature is achieved, the opposing faces mesh and interlock, thereby closing the gap which was created for installation of the seal ring and whereby the gap does not become a point of leakage. It should be noted that due to the fact that the rough opposing faces mesh and interlock, a single seal ring is all that is required to perform the sealing function. In other words, multiple fractured seal rings, wherein the fracture lines are staggered in opposite directions, as has been common heretofore because of the inability of the gap to completely close, is not required to perform the sealing function.

Figure 1:
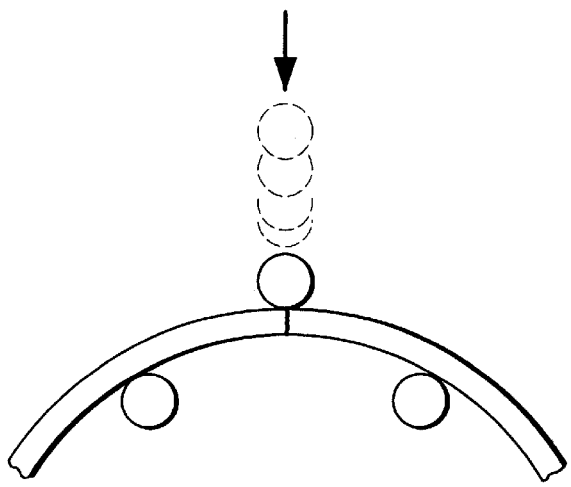
FIG. 1 is a fragmentary view of the seal ring being fractured.

A device for fracturing the seal ring 12 can be described in general terms. The device is made up of both a support means and a pressing means. The support means support the seal ring 12 along its inner surface 20 at two places which are spaced some distance apart, resulting in an unsupported region of the seal ring. The pressing means is then applied to any point around the unsupported region of the outer surface 22 of the seal ring 12, substantially opposite and between the two places, sufficient to create the fracture line 18 in the seal ring 12. It is preferred that the pressing means be applied to the outer surface of the seal ring at a midway point between the two places of the support means. The pressing means is designed to be moved toward and into the space between the two places to an extent sufficient to cause the fracture of the seal ring. It has been found that application of the pressing means from the outer surface directed inward toward the center of the seal ring, as can be seen in FIG. 1, is the preferred way of fracturing the seal ring. The force created by the pressing means places the inner surface of the seal ring in tension while the outer surface is in compression—see FIG. 2. Once the ultimate tensile stress is exceeded, a brittle fracture line initiates from the inside of the seal ring radially outward through the seal ring's thickness. As would be obvious to one of ordinary skill in the art, fracture of the seal ring may be accomplished by movement of the pressing means while holding the support means stationary, movement of the support means while holding the pressing means stationary, or simultaneous movement of both the pressing means and support means.

As can be seen in FIG. 7, one embodiment of a device, shown generally at 30, for fracturing the seal ring 12 according to the present invention, is shown. The support means is made up of a base 32, having a notched portion 34 at one end of the base. On either side of the notched portion 34, extend two support pins 36, which provide support for the seal ring 12. As for the pressing means, this is made up of a bar 38, having a depending portion 40. Extending from the depending portion 40, is a pressing pin 42. The pressing means is aligned with and attached to the support means by two aligning bolts 44. The bolts 44 align the depending portion 40 with the notched portion 34 to guide the pressing means into and between the notched portion 34. Shown in this embodiment are also springs 46 extending between the pressing means and support means, superimposed on each aligning bolt 44. In operation, the seal ring 12 is placed on the two support pins 36, wherein an unsupported region of the seal ring extends between the two support pins. The pressing pin 42 of the pressing means is then pressed against the unsupported region of the seal ring, between the support pins 36, to fracture the seal ring 12. The springs 46 are provided to move the pressing means away from the support means when pressure is relieved for removal of the seal ring from the support pins 36.

The support and pressing pins in practice can be any device suitable to concentrate the force needed to fracture the seal ring without local deformation. The kind of local deformation as might be applied by a knife edge or other sharp-edged device has been found to be detrimental to the seal ring of the present invention because it tends to leave a score on the seal ring surface.

The amount of force required to fracture the seal ring will vary with the material characteristics and cross section of the seal ring, and will be apparent to one of ordinary skill in the art. The rate at which the force is applied to the seal ring is also important. If force is applied too slowly the fracture line will propagate at an angle to the radius. Additionally, slow application of the force, along with hyperextension such that the pin or other fracturing mechanism is moved too far toward the center of the seal ring, may result in deformation of the original round ring shape of the seal ring. If the seal ring is hyperextended, the local elastic limit of the material may be exceeded and the seal ring may deform. If on the other hand the force is applied too quickly, hyperextension may also occur resulting in deformation of the seal ring. For that reason, it is preferred that the rate of application of force to the seal ring should be swift, rather than gradual. The force may be applied by hand pressure or by controlled mechanical means.

Figure 2:
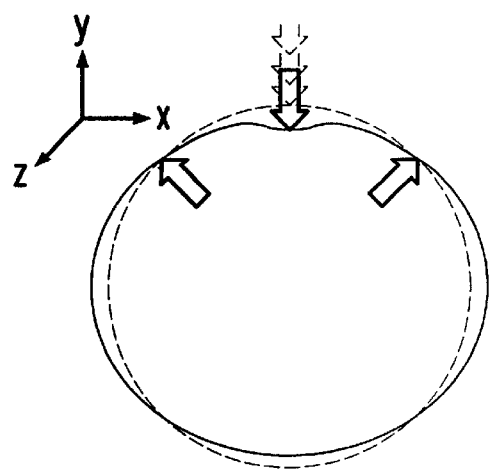
FIG. 2 is a diagrammatic view showing the direction of forces acting on the seal ring to initiate a fracture line.

In practice, the seal ring should be prevented from moving out of the x-y plane as shown in FIG. 2 which is accomplished by having the seal ring positioned flush against the base. In other words, there should be no movement of the seal ring in the z-plane (forming an angle with the base) while the seal ring is being fractured. In fact, the seal ring should be free to deform radially in the x-y plane during fracturing so that the seal ring is not locally deformed but is able to move with the application of force as shown by the dotted lines (before application of the force) and solid lines (during application of the force) as shown in FIG. 2. Therefore, there should be no restraint of the periphery of the seal ring, other than the support means when the seal ring is being fractured.

Using the device as described above according to the method described, results in a seal ring having true roundness, despite a presence of the fracture line therein, which is necessary to perform the sealing function. By "true roundness" is meant the seal's ability to maintain a round form even after the seal has been fractured. In ANSI Y14.5M-1982, true roundness is further defined in that all points of the surface intersected by any plane perpendicular to a common axis are essentially equidistant from that axis. If the seal ring is "out of round," leakage will most likely occur since the outer surface 22 of the seal ring will not make complete contact with the bore 8 of the housing 4. As discussed above, machining a gap into a seal ring wherein some of the seal ring material is actually removed, results in lack of true roundness and an inability to completely close the gap when the opposing faces are brought back into contact with each other as can be seen in FIG. 6B, thereby creating a potential for leakage.

For the seal ring of the present invention, it is essential that no scoring, notching, or etching be applied to any surface to initiate the fracture line 18. If any surface is scored, notched, or etched prior to initiation of the fracture line, leaking will likely occur. As can be seen in FIG. 6A, scoring of the outer surface actually removes some of the seal ring surface, resulting in a potential leak path for fluids. The seal ring of the present invention is, therefore, free of scoring, notching or etching.

Furthermore, certain physical properties are important in a seal ring. Properties of particular importance are tensile strength, modulus and elongation. Although metal seal rings tend to have better tensile strength and modulus, elongation is higher in polymers. It has been found that for rings of the present invention, tensile strength should be in the range of 9000 to 18000 psi ($62.1 \times 10^3$ to $124.1 \times 10^3$ kPa), elongation in the range of 2.5 to 10%, and tensile modulus in the range of 310,000 to 750,000 psi ($2.14 \times 10^6$ to $5.17 \times 10^6$ kPa). One of ordinary skill in the art would understand that these are merely preferred ranges, but are not limiting.

A wide variety of polymers are suitable for use according to the invention. Those which are particularly suitable are polyimide, polyamide, polyester, polyetheretherketone (PEEK), polyamideimide, polyetherimide, polyphenylene sulfide, and polybenzimidazole. If the polymer is a polyimide, it is preferred that it be prepared from at least one diamine and at least one anhydride. Preferred diamines which can be used include m-phenylene diamine (MPD), p-phenylene diamine (PPD), oxydianiline (ODA), methylene dianiline (MDA), and toluene diamine (TDA). Preferred anhydrides which can be used include benzophenone tetracarboxylic dianhydride (BTDA), biphenyl dianhydride (BPDA), trimellitic anhydride (TMA), pyromellitic dianhydride (PMDA), maleic anhydride (MA), and nadic anhydride (NA).

Preferred polyimides include those prepared from the following combinations of anhydride and diamine: BTDA-MPD, MA-MDA, BTDA-TDA-MPD, BTDA-MDA-NA, TMA-MPD & TMA-ODA, BPDA-ODA, BPDA-MPD, BPDA-PPD, BTDA-4,4'-diaminobenzophenone, and BTDA-bis(p-phenoxy)-p,p'-biphenyl. Am especially satisfactory polyimide useful in the present invention is that prepared from pyromellitic dianhydride and 4,4'-oxydianiline (PMDA-ODA).

The polyimide compositions can also contain a blend of at least one polyimide with at least one other polymer which is melt processable at a temperature of less than about 400° C. and is selected from polyamide and polyester resin and may be present in a concentration of from about 45 to 79.9 weight percent. Melt processable is used in its conventional sense, that the polymer can be processed in extrusion apparatus at the indicated temperatures without substantial degradation of the polymer.

A wide variety of polyamides and/or polyesters can be used in the present invention and/or can be blended with polyimides. For example, polyamiides which can be used include nylon 6, nylon 6,6, nylon 610 and nylon 612. Polyesters which can be used include polybutylene terephthalate and polyethylene terephthalate.

A fusible or melt processable polyamide or polyester can additionally be, in the form of a liquid crystal polymer (LCP). LCP's are generally polyesters, including, but not limited to, polyesteramides and polyesterimides. LCP's are described by Jackson et al., for example, in U.S. Pat. Nos. 4,169,933, 4,242,496 and 4,238,600, as well as in "Liquid Crystal Polymers: VI Liquid Crystalline Polyesters of Substituted Hydroquinones."

The polymers of the present invention can further include other additives, fillers and dry lubricants which do not depreciate the overall characteristics of the finished seal rings, as would be evident to those skilled in the art. For example, the incorporation of graphite into the composition can extend the range of its utility as a wear resistant material. Another beneficial additive is carbon fiber, for the purpose of reducing coefficient of thermal expansion. Various inorganic fillers are known to reduce the coefficient of friction and improve wear resistance. The filler used should not prevent the fracturing of the seal ring.

The present invention is further illustrated by the following Examples and Comparative Examples.

EXAMPLES

Seal rings of 1" (2.54 cm) diameter were fabricated from various polymer stock shapes. The seal rings were made up of cross sections of 0.090" (0.23 cm) (both wall and thickness). Various polymers were used to create the seal rings. These particular polymers were chosen for their good wear and low friction properties, which are necessary properties for this type of application. Examples of polymers tested include:
1. Torlon® 4301 (polyamideimide as manufactured by Amoco Chemicals Corporation)
2. Celazole™ U-60 (polybenzimidazole as manufactured by Hoescht Celanese)
3. Polypenco® Techtron™ unfilled polyphenylene sulfide
4. Vespel® polyimide resin (as manufactured by E.I. du Pont de Nemours and Company)
5. Melding® 2001 and 2021 (polyimides as manufactured by Furon Advanced Materials Division)
6. 15% graphite filled Sintimid Comparative Seal Rings
A. Teflon® PTFE (as manufactured by E.I. du Pont de Nemours and Company)
B. Victrex® 450 G (glass filled PEEK by the Victrex Corporation)
C. cast iron having a machined gap
D. Vespel® polyimide resin having a machined gap
   1) SP-21
   2) SP-22

Comparative Examples A and B

Comparative Seal Rings A and B, (Comparative Examples A and B, respectively), were placed in the device, supported at two places and the pressing means was applied to fracture the seal ring. For Comparative Example A, the PTFE was too soft to fracture. In other words, the elongation and tensile strength were 300% and 6500 psi (4480 kPa), respectively. As for Comparative Example B, the elongation of 14% of the glass-filled PEEK was too high and the seal ring would not fracture.

Examples 1–6

Seal rings were made up of polymers 1 to 6, (Examples 1–6, respectively), as described above and were placed in the device, supported at two places on a support means and the pressing means was applied to fracture the seal ring, resulting in a fracture line which was rough. The fracture line did not deviate at an angle to the radius, and the seal ring maintained its true roundness.

Examples 7 and 8 and Comparative Examples C, D1 and D2

Seal rings were made up of polymer 4, (Examples 7 and 8, respectively), as described above, for comparison with Comparative Seal Rings C, D1 and D2 (Comparative Examples C, D1, and D2, respectively). These seal rings were placed in a seal assembly of a transmission of an automobile and were subjected to varying rpm's of the transmission's cylindrical member (shaft), a pressure of 120 psi (827.4 kPa) [normal operating range of 5 to 240 psi (34.5 to 1654.8 kPa)] and a temperature range which varied from room temperature to 220° F. (104.34° C.) [normal operating range of −40 to less than 300° F. (−39.96 to 148.74° C.)]. Leakage data can be seen below in Table 1.

TABLE 1

Seal Ring Leakage Performance in milliliters/minute

| | Room Temperature | | | 220° F (104.34° C) -> | | | | | | | |
|---|---|---|---|---|---|---|---|---|---|---|---|
| | static | 2000 rpm | 3500 rpm | static | 2000 rpm initial | 2000 rpm @ .5 hrs. | 2000 rpm @ 1 hr. | 2000 rpm @ 1.5 hrs. | 3500 rpm initial | 3500 rpm @ .5 hrs | 3500 rpm @ 1 hr. | 3500 rpm @ 1.5 hrs. |
| Example 7 | 75 | 120 | 120 | 80 | 75 | 70 | 75 | 70 | 75 | 85 | 80 | 70 |
| Example 8 | 70 | 70 | 70 | <5 | 15 | 15 | 20 | 20 | 5 | 5 | 5 | 8 |
| Comparative Example C | 100 | 120 | 130 | 160 | 180 | 180 | 190 | 180 | 170 | 170 | 170 | 180 |
| Comparative Example D1 | 230 | 260 | 260 | 140 | 180 | 180 | 180 | 180 | 180 | 180 | 180 | 180 |
| Comparative Example D2 | 240 | 260 | 280 | 160 | 200 | 190 | 190 | 190 | 200 | 190 | 200 | 190 |

The sealing function of Examples 7 and 8 performed properly and leaking was greatly improved over Comparative Examples C, D1 and D2. Since the fracture line was rough, when the seal ring was placed within the seal assembly and pressure was applied, the opposing faces were forced into contact with each other such that they were meshing and interlocking to perform the sealing function.

What is claimed is:

1. A seal ring for placement in the space between a radial groove of a cylindrical member and a housing forming a bore in which said cylindrical member is movably positioned, comprising: at least one polymer selected from the group consisting of polyimide, polyamide, polyester, polyetheretherketone, polyamideimide, polyetherimide, polyphenylene sulfide, and polybenzimidazole, wherein said polymer has (i) tensile strength in the range of 9000 to 18000 psi, (ii) elongation in the range of 2.5 to 10%, and (iii) tensile modulus in the range of 310,000 to 750,000 psi, said seal ring being free of outer surface scoring, and having a fracture line through said seal ring's thickness to form opposing faces, wherein said faces are rough and mesh together such that when said faces are forced into contact, said faces then being interlocked, said seal ring further having true roundness to enable said seal ring to seal said space despite presence of said fracture line, and said seal ring being thereby capable of single ring sealing of said space between said bore and said radial groove.

2. A seal assembly comprising:
i) a housing forming a bore,
ii) a cylindrical member movably positioned within said housing, said cylindrical member having a radial groove which forms a space between said radial groove of said cylindrical member and said bore,
iii) a seal ring positioned within said radial groove of said cylindrical member, further comprising: at least one polymer selected from the group consisting of polyimide, polyamide, polyester, polyetheretherketone, polyamideimide, polyetherimide, polyphenylene sulfide, and polybenzimidazole, said seal ring being free of outer surface scoring and having a fracture line through said seal ring's thickness to form opposing faces, said faces being rough, said seal ring having an inner surface, an outer surface, an upstream surface and a downstream surface, whereby upon movement of said cylindrical member when fluid pressure is applied against said upstream surface of said seal ring, said seal ring achieves true roundness and single ring sealing of said space despite presence of said fracture line in said seal ring by said faces meshing and interlocking together and further by said downstream surface and outer surface of said seal ring being forced into contact simultaneously with said radial groove and said bore, respectively.

* * * * *